United States Patent [19]
Sanghera et al.

[11] Patent Number: 6,021,649
[45] Date of Patent: Feb. 8, 2000

[54] APPARATUS FOR MAKING OPTICAL FIBERS FROM CORE AND CLADDING GLASS RODS WITH TWO COAXIAL MOLTEN GLASS FLOWS

[75] Inventors: Jasbinder S. Sanghera, Greenbelt, Md.; Pablo Pureza, Burke, Va.; Ishwar D. Aggarwal, Fairfax Station, Va.; Reza Mossadegh, Alexandria, Va.

[73] Assignee: The United States of America as Represented by the Secretary of the Navy, Washington, D.C.

[21] Appl. No.: 09/256,231

[22] Filed: Feb. 24, 1999

Related U.S. Application Data

[62] Division of application No. 08/695,444, Aug. 12, 1996, Pat. No. 5,879,426.

[51] Int. Cl.[7] .................................................. C03B 37/023
[52] U.S. Cl. ................................. 65/495; 65/502
[58] Field of Search ............................. 65/405, 388, 389, 65/502, 495

[56] References Cited

U.S. PATENT DOCUMENTS

| | | |
|---|---|---|
| 2,900,708 | 8/1959 | Pond . |
| 4,063,914 | 12/1977 | Roeder et al. . |
| 4,101,305 | 7/1978 | Midwinter et al. . |
| 4,145,200 | 3/1979 | Yamazaki et al. . |
| 4,217,123 | 8/1980 | Titchmarsh . |
| 4,259,100 | 3/1981 | Aulich et al. . |
| 4,351,659 | 9/1982 | Beales et al. . |
| 4,729,777 | 3/1988 | Mimura et al. . |
| 4,897,100 | 1/1990 | Nice . |
| 4,908,053 | 3/1990 | Nishii et al. . |
| 4,925,475 | 5/1990 | Mimura et al. . |
| 5,106,400 | 4/1992 | Tick . |
| 5,185,021 | 2/1993 | Miura et al. . |
| 5,644,023 | 7/1997 | Conti et al. . |

FOREIGN PATENT DOCUMENTS 006969  10/1981  Japan .

*Primary Examiner*—John Hoffmann
*Attorney, Agent, or Firm*—Barry A. Edelberg; Romulo H. Delmendo

[57] ABSTRACT

A core/clad glass optical fiber is made by melting a core glass rod and a cladding glass rod in separate crucibles which are not concentric with respect to each other and the respective core and cladding glass melts passed out of contact with each other to a glass melt contacting zone proximate a fiber drawing orifice in which the cladding glass surrounds the core glass and a core/clad glass fiber is drawn. This process enables the clad glass fiber to be drawn directly from core and cladding glass rods without the need for a preform or forming a melt from glass chards or chunks, thereby reducing the cost of producing the fiber and also producing a glass clad optical fiber of high purity and excellent concentricity. Chalcogenide glass fibers having a concentricity of 100% have been made.

5 Claims, 2 Drawing Sheets

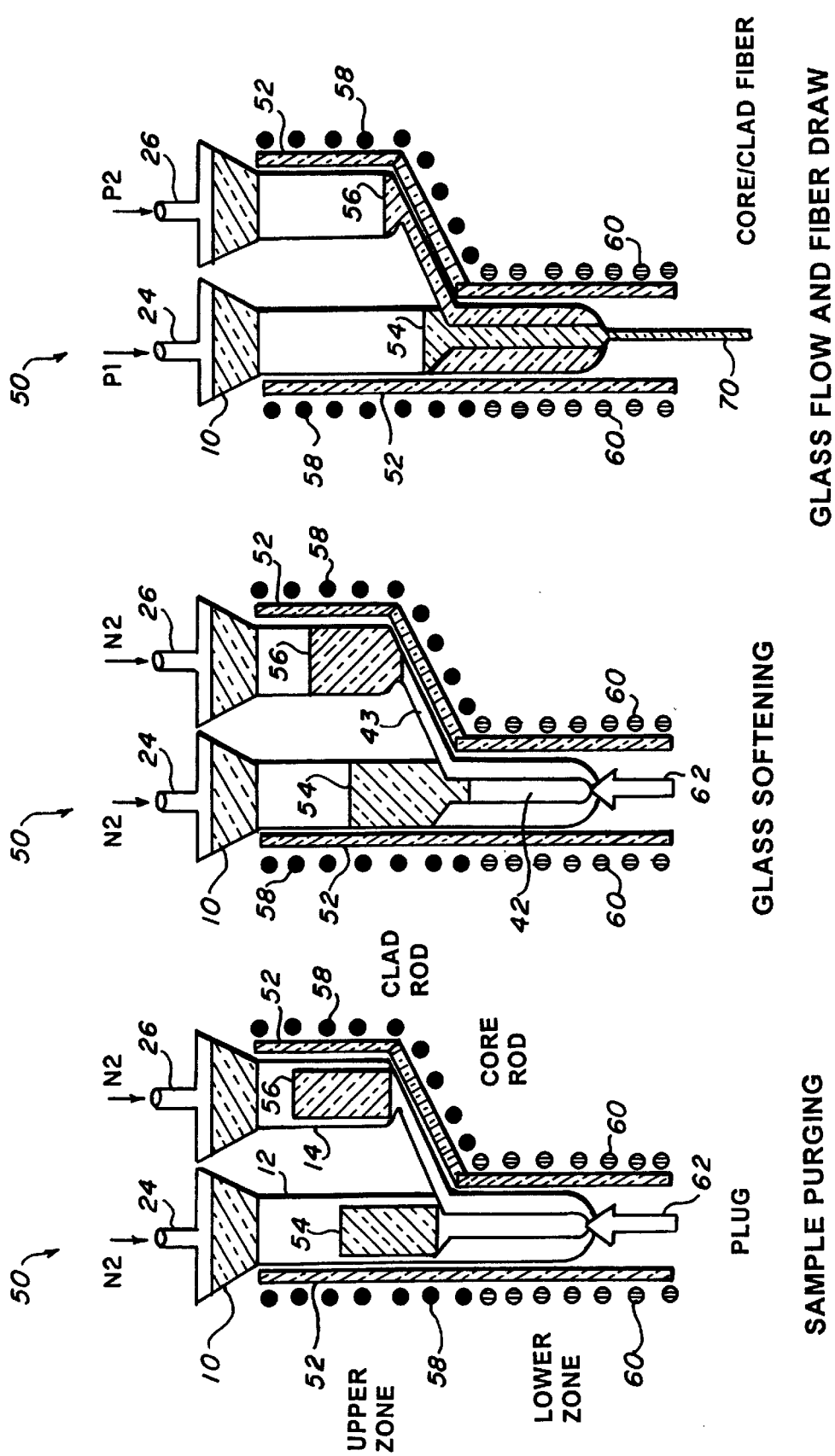

APPARATUS FOR MAKING OPTICAL FIBERS FROM CORE AND CLADDING GLASS RODS WITH TWO COAXIAL MOLTEN GLASS FLOWS

This application is a divisional of U.S. patent application Ser. No. 08/695,444, filed on Aug. 12, 1996, now U.S. Pat. No. 5,879,426.

BACKGROUND OF THE INVENTION

1. Field of the Invention

The invention relates to a process and apparatus for making optical fibers from core and cladding glass rods and to the fibers made by the process. More particularly, the invention relates to separately melting core and cladding glass rods and combining the melts proximate a fiber drawing orifice so that the core glass is surrounded by the cladding glass and drawing a glass clad optical fiber from the combined melts.

2. Description of the Background Art

Optical fibers, windows and filters find increasing use for many applications, particularly in data transmission. For example, silica based optical fibers are widely used in the telecommunications industry. However, silica fibers transmit only up to about 2 microns and there are many applications in which the wavelengths are longer than 2 microns, such as infrared imaging, detection and analysis of high temperatures and high temperature effects and power delivery from CO and $CO_2$ lasers. Remote fiber optic chemical sensing systems are useful for the clean up of Department of Defense and Department Energy facilities, as well as other industrial applications, because practically all molecular species possess characteristic vibrational bands in the infrared region between 3–11 microns. Zirconium fluoride based fibers transmit to about 3.5 microns, but this still isn't sufficient for most infrared systems. Chalcogenide glasses transmit to beyond 10 microns and are therefore used for optical fibers in fiber optic based sensor systems using evanescent, absorption and diffuse reluctance spectroscopies, which require long wavelength infrared transmission capability. Since the efficiency and capability of such systems depends in large measure on the infrared optical properties of the glass, it is important that the glass have low transmission losses. Therefore, there is a need to fabricate low loss chalcogenide glass fibers and especially in long lengths, to enhance the capabilities of many systems. For practical applications the chalcogenide glass fibers need to be glass clad to eliminate unwanted evanescent absorption and bending losses. Core and cladding glass compositions are selected so that the core refractive index is higher than that of the cladding while maintaining similarity in thermal properties. Typical techniques used to fabricate glass clad chalcogenide glass fibers include drawing the clad fiber from a preform fabricated by collapsing a cladding glass tube onto a core glass rod within. However, significant transmission losses can and do occur with the use of glass clad chalcogenide fibers drawn from such preforms due to bubbles in both the core and cladding glass and at the core/cladding lass interface, and also due to soot particles at the core/cladding glass interface caused by fabrication of the preforms and drawing of the clad fibers. These bubbles and soot particles act to scatter the infrared signals being transmitted which results in significant transmission losses. Further, practical size limitations of the preforms limit the process to drawing multimode fibers and the lengths of fiber drawn to typically less than 100 meters. U.S. Pat. No. 4,908,053 discloses drawing a clad fiber from a composite of a glass core rod concentrically disposed within a cladding glass tube in which a space exists between the tube and rod by melting the composite only at the bottom of the crucible in the vicinity of the drawing nozzle. The melting collapses the tube onto the rod only in the melt zone and the composite slowly moves down through the furnace as it is used up. While this process avoids the use of a core/clad preform, it does not prevent bubbles or soot formation at the core/cladding glass interface.

In order to avoid the need for preforms, double crucible processes have been developed in which a core glass crucible is concentrically disposed inside a cladding glass crucible so that the cladding glass melt is in contact with the outside of the core glass crucible. Both crucibles have a hole or orifice concentrically placed in the bottom of the crucible for the glass melts to flow out of, with both orifices coaxial and with the orifice in the bottom of the core glass crucible disposed just above the orifice in the cladding glass crucible. As the core glass melt flows out the orifice through the bottom of the core glass crucible, it contacts and is surrounded by the cladding glass melt and both melts flow out of the orifice in the bottom of the cladding glass crucible and form a clad fiber which is called core/clad fiber. One such process is disclosed, for example, in U.S. Pat. No. 4,897,100 in which core and cladding glass chunks are melted in two separate, but concentric crucibles, with the core glass crucible disposed inside the cladding glass crucible. Each crucible has an orifice at the bottom for drawing out the molten glass, with the core glass crucible orifice disposed just above the cladding glass crucible orifice. Both orifices are coaxial. As the core glass melt flows out the orifice in the bottom of the core glass crucible, it is surrounded by cladding glass flowing down through the orifice in the bottom of the cladding glass crucible and a core/clad fiber is drawn. In this process, melting the glass chunks in the crucibles introduces gas bubbles at the interfaces and interstices of the chards or chunks as they melt. As a consequence, the glass melts are held at elevated temperatures for long periods of time to drive out some of the gas and to achieve homogeneity of the melt. Unfortunately, this can change the composition of the glass over a period of time as more volatile components of the glass are vaporized. Both glass melts are simultaneously withdrawn from the orifice at the bottom of their respective crucibles, with the core glass melt flowing through the cladding glass melt below, so that the cladding glass flows around the core glass as both glasses flow out the bottom of the cladding glass crucible. This process is difficult to control, uniform concentricity of the core and cladding glasses is extremely difficult to achieve, and it does not eliminate bubbles or soot formation. Another approach to the double crucible process is one in which a core glass disk and a cladding glass disk are core drilled from large slabs of glass. The core glass disk is heated and melted in a crucible having a hole in the bottom from which is drawn a core glass fiber. The cladding glass disk is heated in a separate crucible coaxial with and disposed vertically below the core glass crucible and it also has a hole or orifice in the bottom. The solid glass fiber drawn from the core glass crucible passes through the cladding glass melt which coats the core fiber with cladding glass and a glass clad fiber is drawn out the bottom of the cladding glass crucible. Since the solid core glass fiber must pass through the cladding glass melt, both glasses must have a different viscosity profile and the core glass must have a higher melting temperature. Aside from inherent stress, bubbles and soot are formed at the core and cladding glass interface of the fiber produced from this process. Also, the clad fiber has a low melting temperature and cannot generally be used above 110° C., which means that it cannot be used for high power lasers. Still further, core drilling the core and cladding glass disks from large slabs of glass can introduce contaminants onto the glass. None of these double crucible processes is suitable for use with the relatively volatile and unstable chalcogenide glass compositions as both glass compositions remain in the molten state for a long period of time and the resulting volatilization losses lead to compositional variations in the core and cladding glasses, which itself leads to increased optical losses. Therefore, there is still a need for a method of producing core/clad glass optical fibers without the need for a core/clad preform or the use of glass chunks, with little or no soot formation at the interface between the glasses, and which will also eliminate or at least minimize the size and frequency of bubbles present in the glasses.

SUMMARY OF THE INVENTION

Accordingly, it is an object of this invention to produce a core/clad glass optical fiber without the need for a core/clad preform or the use of glass chunks.

It is another object of the present invention to reduce or eliminate soot formation at the core/clad interface of a core/clad glass optical fiber.

It is a further object of the present invention to reduce or eliminate bubble formation at the core/clad interfaced of a core/clad glass optical fiber.

These and additional objects of the invention are accomplished by a process in which the core and clad glass are melted in separate crucibles or melting zones. The two melts are then separately passed into and through two respective glass melt flow zones out of contact with each other to a respective orifice or exit means for each flow zone, wherein they exit their respective flow zones and contact each other as melts proximate a fiber drawing orifice or die, with the cladding glass melt surrounding the core glass melt proximate the fiber drawing orifice or die from which a core/clad fiber is drawn. The two crucibles or melting zones are neither concentric nor coaxial as in the prior art double crucible processes, although they may be so disposed if desired. In an embodiment used to demonstrate the efficacy of the process of the invention, the two glass melting zones are laterally or horizontally spaced apart and not vertically disposed with respect to each other as in the prior are double crucible processes. This enables better control of (i) the glass melting operation, (ii) the atmosphere and pressure in each crucible and (iii) minimizes contamination of the glass melt in each crucible as is explained in detail below. It also permits the melting zones and crucibles to be heated to different temperatures, if desired. The process of the invention forms optical fibers directly from a core glass rod and a cladding glass rod without the need for core/clad preforms, cladding glass tubes, without forming melts from chards or chunks of glass with its concomitant gas absorption and entrapment and prolonged heating times, and without being restricted to maintaining both glass melts at the same temperature. In the process of the invention, the two glass melting zones may be at a temperature different from the temperature in the glass melt flow zones and the glass contacting/fiber drawing zone. The use of glass rods permits the use of simple rod geometries, which need not be cylindrical, but can be of any practicable shape and which can be fabricated in sizes both larger and smaller than is presently practicable with processes which use rod and tube combinations or preforms. Another advantage is that the dimensions of the rods need not be precise, as is the case when using core rod and cladding tube assemblies and fabricating preforms. Still another advantage of forming a glass melt directly from a rod is that the rod can be formed under sealed conditions in a suitable ampoule or other means and the so-formed rod directly melted without undergoing further processing into chards, preforms, tubes and the like, all of which introduce gas bubbles, soot and other contaminants into the glass. If desired by the practitioner, the glass "rods" employed as the source the core and cladding glass in the process of the invention can be disk-shaped and can also be in the form of hollow tubes, if desired. However, to the extent that these disk and hollow-tube shapes can and do result in soot formation and/or gas bubbles and other contaminants in the optical fiber, it is preferred that the rods be solid bodies of glass and still more preferably that the length of the glass body be at least equal to the average cross-sectional dimension or equivalent diameter in the event that a shape other than cylindrical is used. In the process of the invention, the glass melting zones (crucibles) and melt flow zones, as well as the core and cladding glass rods, can be outgassed prior to forming the melts and then replaced with an inert gas atmosphere during melting and drawing. The core and cladding glass rods are each melted either as a single mass or slowly melted proximate their bottom portion only during the process, to further minimize heat exposure of the glass compositions and concomitant volatilization and compositional variation defects during the melting. By melting it is meant that the glass is soft enough to flow and this must be determined empirically for each composition, as it is a function of the melting temperature, the pressure on the glass melt and the viscosity of the glass. In a broad sense, by melt is meant a softened glass at a temperature above its glass transition temperature and having a viscosity within the broad range of from about $10^0$–$10^9$ poise, and more specifically within the range of from about $10^3$–$10^6$ poise for chalcogenide glass.

While the process of the invention has been demonstrated with chalcogenide core and cladding lass compositions, it is useful with all glass compositions and not limited for use with chalcogenide glass. Illustrative, but nonlimiting examples of other types of glass which can be formed into glass clad glass fibers include silicates, fluoride glasses, phosphates, borates and germanates. As those skilled in the art know, chalcogenide glasses comprise at least one of the chalcogenide elements S, Se and Te and typically further include at least one of Ge, As, Sb, Tl, Pb, Si, P, Ga, In, La, Cl, Br and I. Such glasses can also contain one or more rare earth elements. Chalcogenide glass typically contains at least about 25 mole % and more generally at least 50 mole % of one or more of the three chalcogenide elements. The presence of tellurium in the glass composition has been found to increase the transmission in the infrared region. Thus, while sulphide fibers such as $As_2S_3$ transmit from about 1–6 microns, the transmission window is increased to beyond 10 microns by including the heavier chalcogenide element tellurium. Glasses containing high levels of tellurium typically transmit in the 3–12 microns region.

In demonstrating the invention, a cylindrical core glass rod was placed in a tubular shaped quartz crucible or melting zone and a cylindrical cladding glass rod was placed in a separate quartz crucible or melting zone laterally spaced apart from the core glass crucible, so that the longitudinal axes of both crucibles were not coincident and both crucibles were laterally spaced apart from each other at about the same horizontal level. Each crucible had an orifice at the bottom which is opened into a respective melt flow zone. Each rod was heated in its respective crucible or melting zone to soften the glass so that it flowed down into a respective glass melt flow zone (also fabricated from quartz) without contacting the other glass melt, with the cladding glass melt flow zone surrounding the core glass melt flow zone. The bottom of the cladding glass flow zone contained an orifice which functioned as the fiber drawing orifice and the core glass flow zone had an exit orifice positioned proximate the drawing orifice, but slightly above and coaxial with it, so that the core glass melt was surrounded by the cladding glass melt proximate the drawing orifice top produce a core/clad optical fiber as both melts flowed down and out of the drawing orifice. In this embedment the core glass melt was surrounded by and contacted the cladding glass melt before the two melts exited the apparatus via the cladding glass orifice which functioned as the fiber drawing orifice. However, in another embodiment the cladding glass melt will flow out of its orifice in the form of a cone-shaped annulus which contacts the core glass melt, which is in the form of a string or fiber of glass, just below the cladding glass melt orifice which is also the fiber drawing orifice or die. In still another embedment the core glass melt contacts the surrounding cladding glass melt within the cladding glass orifice or fiber drawing orifice or die. By "proximate the fiber drawing orifice" it is meant to include all three embodiments as will be appreciated by those skilled in the art. Both melt flow zones were heated to the same temperature to melt the respective glasses. Both crucibles were heated to the same melt temperature to melt the respective glasses. Thus, in this embodiment the process of the invention comprises the steps of (a) melting a core glass rod and a cladding glass rod in respective crucibles which are neither concentric nor coaxial and are laterally spaced apart from each other, (b) flowing each glass melt through a respective melt flow zone so that the melts are not in contact with each other, (c) passing the melts from the flow zones to a contacting zone in which the glass melts come into contact, with the cladding glass melt surrounding the core glass and drawing a core/clad fiber (a glass core/glass clad fiber) from the contacting zone. Further embodiments include outgassing the melting zone, the flow and contacting zones and also the core and cladding glass rods in their respective crucibles prior to melting the glasses. Yet another embodiment includes applying an inert gas atmosphere to the respective melts in the respective crucibles and also to applying a pressure to the glass melts by means of the gas to assist the glass melts to flow at a lower temperature than that at which flow would occur without the use of pressure. Further embodiments include (i) maintaining the melt and flow zones at different temperatures and (ii) maintaining the two melting zones or crucibles at different temperatures. Core/clad chalcogenide glass fiber produced by the process of the invention has been made with a concentricity of 100%. Also, while the above illustrations have been directed to multimode optical fiber production, the method of the invention is also useful for producing single mode optical fibers. Finally, those skilled in the art will appreciate that the addition of a third glass melting zone and another melt flow zone at least partially surrounding the first melt flow zone, etc., will enable the production of a double glass clad-glass core optical fiber.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

FIG. 2 (a), FIG. 2 (b), FIG 2 (c) each schematically illustrate, in cross-section, the apparatus of FIG. 1 and the core and cladding glass rods and melts during the process of the invention.

DESCRIPTION OF THE PREFERRED EMBODIMENTS

Figure 1:
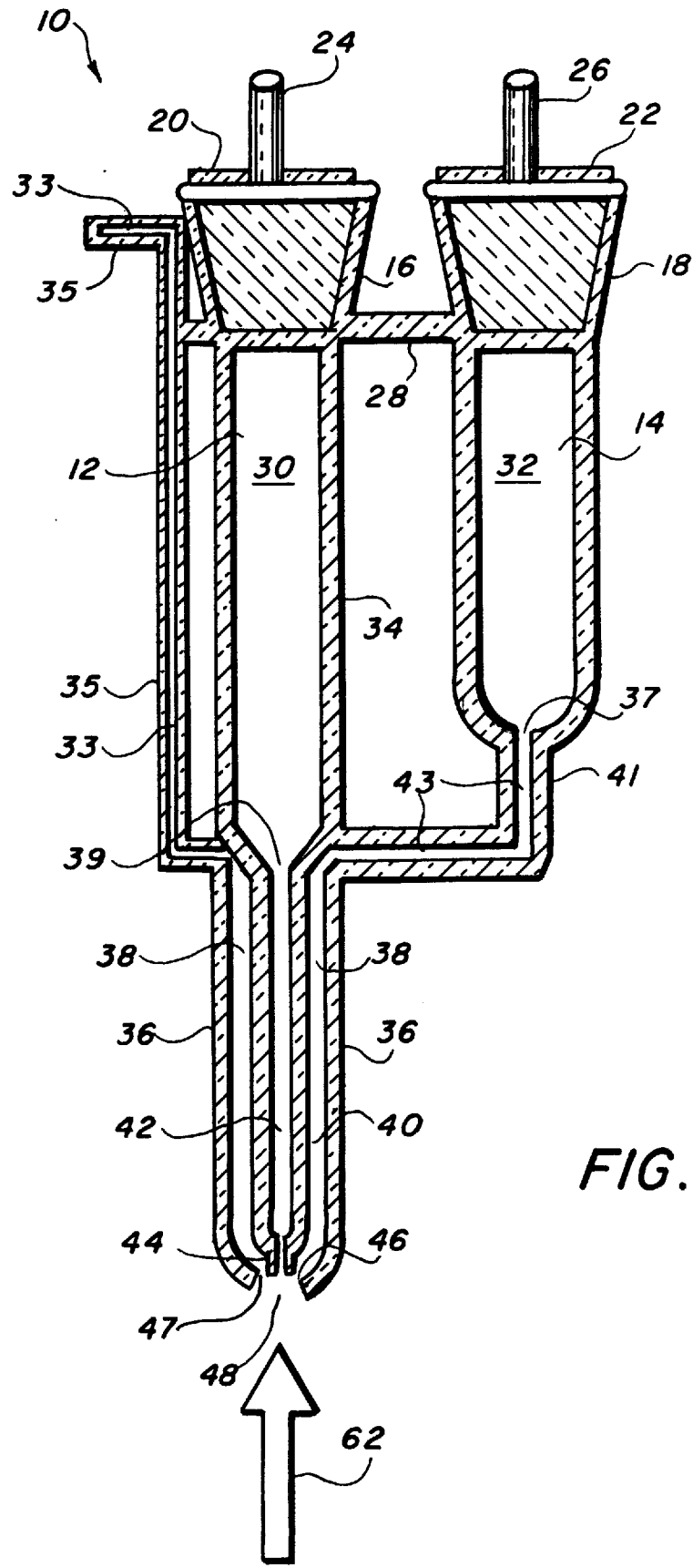
FIG. 1 schematically illustrates a across-section of an apparatus useful for the process of the invention.

Referring to FIG. 1, a cross-section of an apparatus 10 useful for the practice of the process of the invention is schematically shown as comprising hollow, tubular crucibles 12 and 14 each having a tapered ground glass (quartz glass) top 16 and 18 covered by respective hollow covers or stoppers 20 and 22 which possess respective gas fittings 24 and 26. Crucibles 12 and 14 contain respective glass melt zones as cavities 30 and 32 within. Gas fittings 24 and 26 enable a vacuum to be applied to the interior of the apparatus for outgassing both the interior surfaces of the apparatus and the exterior surface of a glass core rod (not shown) and a glass cladding rod (not shown). They also enable inert or reactive gas to be applied to the interior 30 and 32 of the crucibles over the glass cladding and core rods and the glass melts during the process of melting, flowing and drawing. The inert gas serves to prevent the surfaces from being contaminated during the process and assists in the melt flow and drawing by applying pressure above the glass melts (not shown). In this embodiment, support 28 aids in maintaining the crucibles in their proper positions and makes the apparatus stronger and less prone to breaking. The apparatus shown is fabricated from quartz which is sometimes referred to as fused silica or quartz glass. Those skilled in the art will appreciate that if a higher melting glass and not chalcogenide glass rods are used, the apparatus will be made of a suitable higher melting material such as platinum, platinum alloy and the like. In this embodiment the ground glass surfaces enable a seal to be made by the hollow quartz stoppers 20 and 22. Support 28 is a quartz rod. The wall 34 of crucible 12 continues down to form a tubular cylinder defined by wall 36 which forms a cylindrical cavity 38 having an annular or washer-shaped cross-section. The bottom of crucible 12 contains an orifice or opening 39 which extends down into cavity 42 in tube 40. Crucible 14 also has an orifice 37 at the bottom which extends down into cavity or bore 43 of tubular conduit 41 and then into cavity 38. Conduit 41 is jointed to cavity 38 defined by walls 34 and 36. Bore 43 and cavity 38 are contiguous and serve as the melt flow zone for the cladding glass melt which flows down therethrough as a result of melting the cladding glass rod in cladding glass crucible 14. Similarly, bore 42 serves as the melt flow zone for the core glass melt which is formed by melting the core glass rod (not shown) in core glass crucible 12. Capillary tube 35 extends out from wall 36 and up to near the top of the apparatus and contains a bore 33 opens into cavity 38 at its lower end and at the other end is open to the atmosphere and serves as a gas conduit, so that any gas present in 38 flows into 33 and out through the upper end of the capillary as the cladding glass melt flows out of its crucible or melting zone and fills up cavity 38. The bore 33 is too small for the glass to flow through. Inert gas applied to the top of the melts via hollow stoppers 20 and 22 serves to push the glass melts down through the melt flow zones which are cavities 38, 42 and 43. As can be appreciated by reference to FIG. 1 and as shown in detail in FIGS. 2 (a), 2 (b), and 2 (c), the liquid core glass exits its melt zone (cavity 42) via tubular orifice 44 which extends down and provides an outlet for the cladding glass melt at a point just above orifice 48 where it is surrounded and contacted by the liquid cladding glass flowing out of cavity 38 and gaps 46, 47 through 48 which serves as the fiber drawing orifice. The melts contact each other in contact zone 48 defined by the brief space between the bottom of cladding glass melt flow orifice 44 and fiber drawing orifice 48. A core/clad glass optical fiber (not shown) is drawn down out of orifice 48. A loose fitting quartz plug 62 is placed in the bottom openings 44 and 48 until the fiber is ready to be drawn. Not shown in FIG. 1 is the furnace which comprises the means for heating crucibles 12 and 14 and the melt flow zones. This is illustrated in FIG. 2 and is explained in detail below.

Turning now to FIGS. 2 (a), 2 (b) and 2 (c) which illustrate the process of the invention and an apparatus 50 useful for the process of the invention is shown as comprising an apparatus 10 substantially that illustrated in FIG. 1, but lacking some of the details for the sake of brevity. Apparatus 10 is shown surrounded with a furnace which comprises a glass (Pyrex or quartz) shroud 52 around the outside of which are heating means 58 and 60 which are resistance wire, tape or any other suitable means as is known to those skilled in the art. In the embodiment used in the examples, the heating means were heating tape, with the glass shroud and heating tape wrapped with Fiberfax™ thermal insulation; a type of fiberglass insulation known to those skilled in the art. The glass shroud is sized so as to conform as close as possible to the shape of the exterior of the apparatus so as to achieve uniform heating. With specific reference first to FIG. 2 (a), a glass core rod 54 and a glass cladding rod 56 are shown in respective crucibles 12 and 14, with a loose fitting quartz plug 62 placed in the bottom opening. In this embodiment heating means 58 and 60 comprise two separate heating tapes wrapped around the outside of the glass container so that the glass softening or melting zones (crucibles 12 and 14) can be heated to a different temperature than the melt flow and drawing zones below, if desired. The glass core and cladding rods are placed in their respective crucibles as shown and the entire apparatus is heated up to about 100° C. while a vacuum is applied to the interior of the apparatus and to the exterior surface of the glass rods through gas fittings 24 and 26 to vacuum outgas the interior of the apparatus and also the glass rods. The rods and the interior of the apparatus are then purged with dry nitrogen through fittings 24 and 26 and the melting zones or crucibles are then heated to a temperature above the glass transition temperature of the glass by heating tapes 58, while the lower melt flow and fiber drawing zone is heated to the same or different temperature by heating tapes 60. The heating causes the glass rods to soften and the glass to flow into respective core and cladding glass conduits 42 and 43 as shown in FIG. 2 (b) and the pressure applied to the glass melts through 24 and 26 is increased. The plug 62 is removed and the core/clad glass fiber drawn from the bottom as illustrated in FIG. 2 (c). The process of the invention enables good concentricity of the core and cladding glass to be achieved in the fiber. Concentricity is determined by measuring the cross-section of the core/clad fiber produced at a number of different points along the length of the fiber, measuring the maximum and minimum cladding thickness at each point, and then dividing the minimum value by the maximum value times one hundred to obtain the concentricity as a percentage value. Core/clad chalcogenide glass fiber produced by the process of the invention has been made with a concentricity of 100%.

Having described the invention, the following examples are given to illustrate specific applications of the invention including the best mode now known to perform the invention. These specific examples are not intended to limit the scope of the invention described in this application.

EXAMPLES

In the Examples below, chalcogenide core glass rods having a composition $As_{40}S_{58}Se_2$ (atomic %) were fabricated from elemental starting materials of reagent grade purity which had been further purified. For each rod, the arsenic, sulfur and selenium were weighed out, dry mixed and placed in a quartz glass ampoule made from fused silica in a dry box, with the ampoules then evacuated and sealed with an oxygen-methane torch. The chalcogenide cladding glass rod had a composition $As_{40}S_{60}$ and was fabricated using the same procedure. Melting of the glass batches was done at 850° C. for 8 hours in a rocking furnace to facilitate mixing. The melts were then quenched with the ampoules in a vertical position and annealed from about the glass transition temperature (~200° C.) to produce rods approximately 10 cm in length and 10 mm in diameter. The difference in thermal expansion and contraction between the chalcogenide glass and the quartz glass results in the diameter of the chalcogenide glass rods being slightly less than that of the quartz, so that the rods are merely removed from the ampoules after the top has been broken off. The chalcogenide glasses do not react with quartz at the temperatures used in the process of the invention as set for the in the examples below.

Example 1

In this example the apparatus schematically illustrated and described in FIGS. 1 and 2 was used. The apparatus as shown in FIG. 1 was fabricated of quartz and then placed within a snug fitting glass container having heating tapes wrapped around the outside as shown in FIG. 2 to form two independent heating zones. The dimensions of the core and cladding glass rod crucible tubes 12 and 14 were both 12×18 mm. The distance from the intersection of the bottom of the cladding glass conduit 41 with quartz glass wall 36 to the bottom of the melt flow and drawing zone was 3 inches. Conduit 41 was 6×10 mm and the core rod glass flow conduit 40 was 5×8 mm with a 1 mm gap between the bottom of the core glass flow orifice 44 and the bottom of the inside of the outer wall 36 which served as the glass melt contact zone in which the core glass flowed down and out of the orifice in the bottom of its flow conduit and contacted the cladding glass melt which surrounded it prior to the glasses exiting out the bottom of the apparatus as a core/clad glass optical fiber. The draw orifice had a diameter of 7 mm and the orifice at the bottom of the core glass flow conduit was 3 mm. Both orifices were grounded and slightly tapered outwardly for ease of plugging. As explained above, one heating zone was the upper zone which heated the two crucibles or glass melting zones and the other heating zone was the lower zone which comprised the glass melt flow zone and the fiber drawing zone. The hollow stoppers (20 and 22) were removed from the ground glass joints and the core and cladding glass rods placed in their respective crucibles, with the core glass rod in the central tube 12 and the cladding glass rod in the outer tube 14 as shown in the Figures. The hollow stoppers were then re-positioned in the ground glass joints at the top and connected to a nitrogen gas supply and a loose fitting quartz plug (62) was placed in the bottom opening. The glass rods and apparatus were then purged with dry nitrogen gas and heated up to a set temperature of approximately 395° C. in the upper zone and to a temperature of 375° C. in the lower zone, both temperatures being above the glass transition temperature of approximately 200° C. The zonal temperature differences were arbitrary. Under these conditions, the core and cladding glass rods softened and flowed into their respective melt flow conduits under a nitrogen pressure of approximately one inch of water, thereby plugging up the openings at the bottom of each crucible tube as illustrated in FIG. 2 (b). As a result, the pressure above each glass started to increase and the pressure was controlled using a pressure controller and a pressure relief valve. Initially the set temperatures in the upper and lower zones were reduced to 370° C. and 358° C., respectively, and the pressure above the core and cladding glass rods was increased to 1.5 inches (P1) and 2 inches of water (P2), respectively. Subsequently, the quartz plug was removed and the core/clad fiber emerged from the bottom of the quartz glassware as shown in FIG. 2 (c). The fiber was drawn with core and cladding diameters of 175 $\mu$m and 235 $\mu$m. The fiber exhibited a concentricity of 100%. A thicker fiber with core and cladding glass diameters of 190 $\mu$m and 250 $\mu$m was obtained by decreasing the set temperature of the upper and lower zones to 362 and 348° C., respectively and increasing the pressure above the core and cladding glass rods to 0.2 and 0.5 psi, respectively. Over fifty meters of this fiber was collected on a winding drum and had a concentricity of 100%.

Example 2

In this experiment the lower portion of the quartz glassware was significantly shorter, being only about ¾ inches long as compared to the 3 inches of the apparatus used in Example 1. Also, the core and cladding glass openings in the bottom were increased to 4 and 8 mm, respectively, from the 3 mm and 7 mm used in Example 1. Increasing the exit dimensions enables a thicker fiber to be drawn. In this experiment a 400 $\mu$m diameter core/clad glass fiber was drawn when the top and bottom zone temperatures were 371° C. and 363° C., respectively, and the core and cladding pressures were 0.5 psi and 0.2 psi, respectively. Further, when the top and bottom temperatures were 366° C. and 362° C. and the nitrogen pressure on the core and cladding glass pressures was 0.3 psi and 0.2 psi, respectively, 350 $\mu$m diameter core/clad fiber was drawn.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. An apparatus useful for forming a glass core/glass clad fiber, said apparatus comprising
    a first crucible having an open top and a bottom, said bottom of said first crucible terminating in an orifice, said orifice of said first crucible connecting said bottom of said first crucible with a conduit, said conduit extending downward from said orifice in said bottom of said first crucible and joining with a cavity, said cavity extending downward and terminating in a fiber drawing orifice;
    a second crucible having an open top and a bottom, said bottom of said second crucible having an orifice, said orifice of said second crucible extending downward into a bore concentric and contiguous with said cavity, said bore terminating at an outlet above said fiber drawing orifice, with a gap existing between said outlet and said fiber drawing orifice, said first crucible and said second crucible being spaced apart from each other, and said first crucible and second crucible being nonintersecting with respect to each other;
    a first heater for maintaining contents in said first crucible at a first temperature; and
    a second heater for maintaining contents in said second crucible at a second temperature different from said first temperature.

2. An apparatus according to claim 1
wherein said crucible and said second crucible are quartz.

3. An apparatus according to claim 1
having means for introducing a gas into at least one of said first and second crucibles.

4. An apparatus according to claim 1 further including a furnace for heating said first and second crucibles.

5. An apparatus according to claim 4 wherein said furnace means includes more than one heating zone, at least one of said heating zones being capable of heating to a temperature different from the temperature of another heating zone.

* * * * *